United States Patent
Moskalev

(12) 
(10) Patent No.: US 6,222,643 B1
(45) Date of Patent: Apr. 24, 2001

(54) PROBABILITY ERROR DIFFUSION FOR DIGITAL IMAGE PRINTING

(75) Inventor: Anatoly Moskalev, Irvine, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/192,954

(22) Filed: Nov. 16, 1998

(51) Int. Cl.[7] .................................................. H04N 1/405
(52) U.S. Cl. ......................... 358/1.9; 358/458; 382/252
(58) Field of Search ........................ 358/1.9, 456, 458, 358/298, 534; 382/252

(56) References Cited

U.S. PATENT DOCUMENTS 5,663,810 * 9/1997 Kirk ....................................... 358/456
5,973,803 * 10/1999 Cheung et al. ........................ 358/534

OTHER PUBLICATIONS

Wong et al, "Entropy–Constrained Error Diffusion", 1995 SID Digest, pp. 905–908.*

Robert W. Floyd and Louis Steinberg, "An Adaptive Algorithm for Spatial Greyscale", Proceedings of the Society for Information Display, Symposium Digest of Technical Papers, vol. 17/2, Second Quarter, 1976, pp. 75–77.

\* cited by examiner

*Primary Examiner*—Scott Rogers
(74) *Attorney, Agent, or Firm*—Akin, Gump, Strauss, Hauer & Feld, L.L.P.

(57) ABSTRACT

An image processing system uses probability error diffusion, and is implemented using a variety of devices capable of reproducing image data including color photo-copy machines, color facsimiles, color printers, black and white printers, and digital printers. The image processing system is employed in a multi-functional peripheral capable of performing several functions. The image processing system identifies which channels in a printing device will print a pixel, and applies error diffusion to those channels. The image processing system determines characteristics of the pixel and subsequently calculates a pixel placement probability, and then applies the error diffusion to the pixel placement probability. Error diffusion may also be applied to a difference between the pixel placement probability and a print probability.

20 Claims, 5 Drawing Sheets

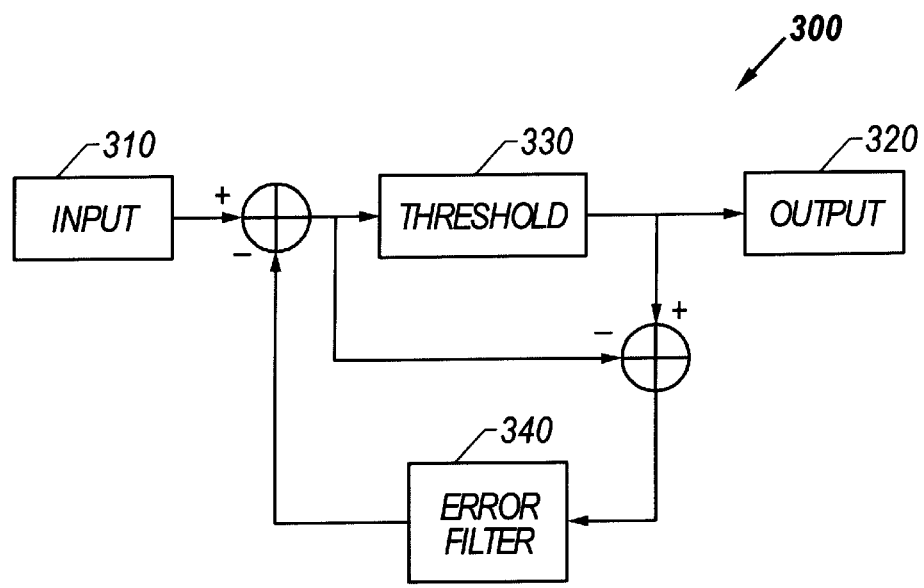
FIG. 3
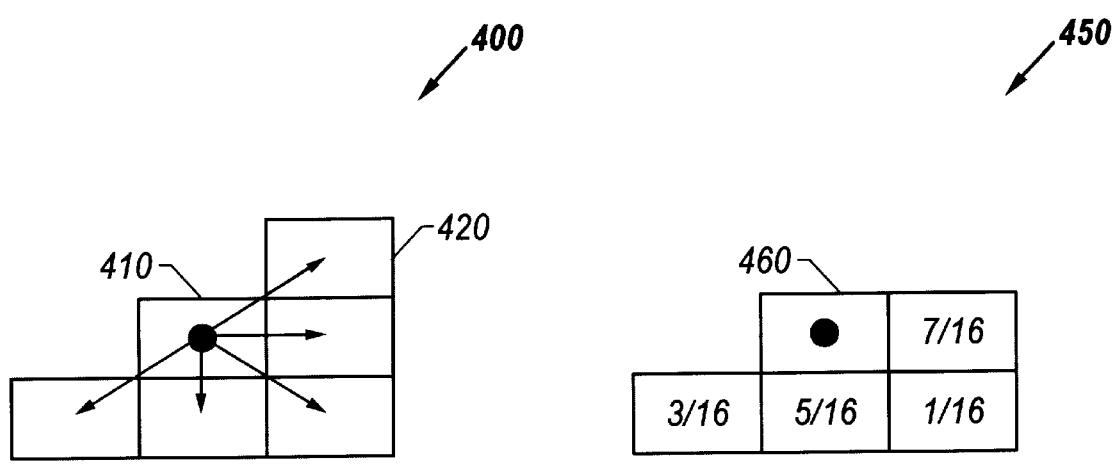
FIG. 4A  FIG. 4B

PROBABILITY ERROR DIFFUSION FOR DIGITAL IMAGE PRINTING

BACKGROUND

1. Technical Field

The present invention relates generally to digital image printing; and, more particularly, it relates to probability error diffusion techniques applied to digital image printing systems.

2. Description of Prior Art

Conventional digital image printing systems commonly employ various methods of error diffusion to pixel intensity. Classic error diffusion generates a pseudo random pixel structure having intermediate levels of the pixel intensities. The intermediate level of a given pixel is adapted to the nearest intensity that can be generated using the available resources of the printing system. The difference between the actual pixel information and the nearest intensity that is chosen to print the pixel is recorded and this difference is an error to which the error diffusion method is applied. The error is spread or diffused over pixels adjacent to the pixel used in a predetermined mask.

Drawbacks of the classical error diffusion method when applied to the pixel's intensity include the fact that pixel intensity, when viewed within a certain spatial vicinity, are inherently coupled one to another. For example, the human eye integrates a group of the image data as a function of the intensity of the pixels in a near spatial vicinity to the pixel. The fact that the classic error diffusion method uses the pixel characteristic of intensity results in many deleterious visible effects and performance limitations. The pixel characteristic of intensity is intrinsically coupled to the pixels in the near vicinity of the pixel. The performance limitation of the classic error diffusion method stems primarily from the fact that is impossible to decouple the intensity characteristic of the pixel absent some additional image processing.

Further limitations and disadvantages of conventional and traditional systems will become apparent to one of skill in the art after reviewing the remainder of the present application with reference to the drawings.

SUMMARY OF THE INVENTION

Various aspects of the present invention can be found in an image processing system that converts a plurality of image data into a form suitable for reproduction. The invention takes in the plurality of data into the image processing and operates on the plurality of data to convert it so that it may be displayed or reproduced on, for example, a printing medium. When using paper as the printing medium, a printer deposits, for example, ink, wax, or some other marking medium on the paper. The marking medium leaves a visibly perceptible modification to the paper for viewing of the plurality of image data in a manner substantially similar to the actual and original representation of the plurality of image data.

In certain embodiments of the invention, the image processing system may be contained within a single function device or peripheral. In other embodiments, the image processing system may be contained within a multi-functional peripheral. The multi-functional peripheral is a peripheral device containing a plurality of internal devices wherein each of the devices operates either independently or cooperatively to process the plurality of image data.

Various other aspects of the present invention may be found in a method that employs error diffusion to a pixel placement probability that is generated using the image processing system. The pixel placement probability is generated directly using at least one characteristic of a pixel. In other embodiments, the pixel placement probability is generated through at least one intervening value wherein the at least one intervening value is calculated from the at least one characteristic of the pixel. The characteristic of the pixel may comprise an intensity value or chroma information of the pixel, depending on the embodiments. In certain embodiments of the invention, the at least one intervening value is a pixel ink density of the pixel.

The error diffusion may utilize a predetermined threshold mask to diffuse the error to pixels adjacent to the pixel. Alternatively, the predetermined threshold mask can be used to diffuse the error to pixels that are not immediately adjacent to the pixel. In either embodiment, the error is diffused to pixels contained within the plurality of image data.

Other aspects, advantages and novel features of the present invention will become apparent from the following detailed description of the invention when considered in conjunction with the accompanying drawings.

BRIEF DESCRIPTION OF DRAWINGS

FIG. 3 is a functional block diagram illustrating another embodiment of the present invention. In particular, FIG. 3 illustrates an error diffusion method.

FIG. 4a is a system diagram illustrating another embodiment of the present invention. In particular, FIG. 4a illustrates a specific embodiment that uses the error diffusion method described in FIG. 3.

FIG. 4b is a system diagram illustrating another embodiment of the present invention. In particular, FIG. 4b illustrates another specific embodiment that uses the error diffusion method described in FIG. 3.

FIG. 5 illustrates a plurality of pixels.

FIG. 6 illustrates a probability error diffusion method.

FIG. 7 illustrates another probability error diffusion method.

FIG. 8 illustrates a multi-functional peripheral that performs image processing to make a plurality of data suitable for printing.

FIG. 9 illustrates an image processor that performs image processing to make a plurality of data suitable for printing.

DETAILED DESCRIPTION OF DRAWINGS

Figure 1:
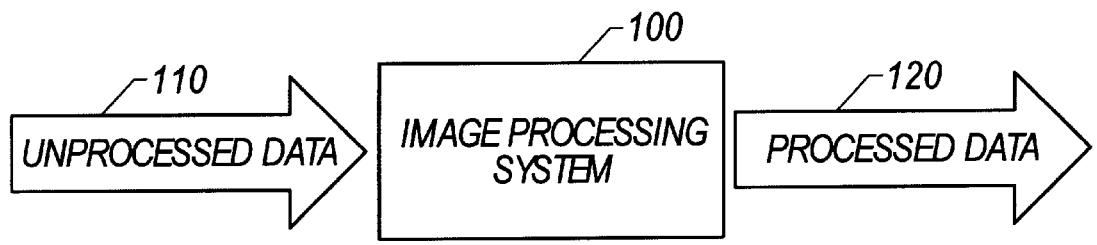
FIG. 1 is a system diagram of an image processing system built in accordance with the present invention, wherein, the image processing system takes in a plurality of unprocessed data and outputs a plurality of processed data.

FIG. 1 is a system diagram depicting the present invention which, in one embodiment, is an image processing system 100 that takes in a plurality of unprocessed data 110 and outputs a plurality of processed data 120. The image processing system 100 performs the loading of the plurality of unprocessed data 110 into a memory (not shown) from which selected portions of the plurality of unprocessed data 110 are processed in a sequential manner. The processing circuitry possesses insufficient processing capability to handle the entirety of the plurality of unprocessed data 110 at a single, given time. The processing circuitry transfers data from the memory for processing, and returns the plurality of processed data 120 to the memory.

In certain embodiments of the invention, the image processing system 100 is a system that converts raw image data into image data suitable for printing. Various devices may be used to perform the printing including color photo-copy machines, color facsimiles, color printers, black and white printers, and digital printers. In other embodiments of the invention, the image processing system 100 is a system that converts raw image data into image data suitable for display. Various displays may be used in accordance with the present invention including monitors and other media capable of displaying digital image data. In other embodiments of the invention, the image processing system 100 converts image data that is already in a form suitable for printing, yet additional processing is performed to improve the visible perceptual quality of the image for reproduction.

Figure 2:
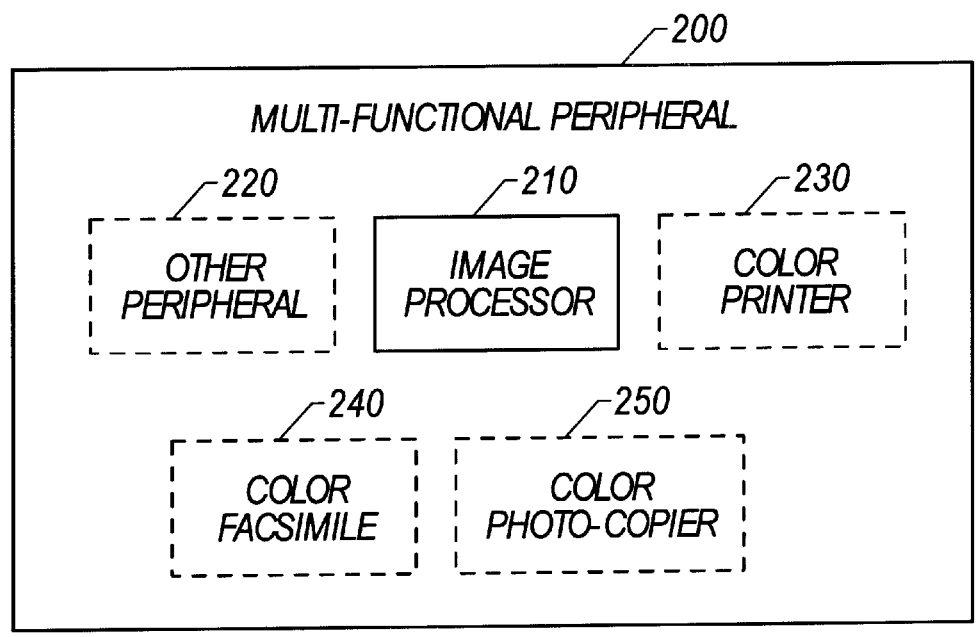
FIG. 2 is a system diagram of a multi-functional peripheral that contains an image processor.

FIG. 2 is a system diagram illustrating another embodiment of the present invention. In particular, FIG. 2 illustrates a multi-functional peripheral 200 that contains an image processor 210. In certain embodiments, additional peripheral devices are included in the multi-functional peripheral. The multi-functional peripheral 200 may contain any number of devices that cooperatively perform processing using the image processor 210 to prepare image data in a form suitable for printing or display that is of a high visible perceptual quality. Examples of such devices include color photo-copy machines, color facsimiles, color printers, black and white printers, and digital printers.

In certain embodiments of the invention, the multi-functional peripheral 200 may contain several of the devices described above. In certain embodiments of the present invention, a color printer 230 is included in the multi-functional peripheral 200. In other embodiments, a color photo-copier 250 and a color facsimile 240 are both contained in the multi-functional peripheral 200 thereby providing multiple functions all within a single device. Those having skill in the art will recognize that any other peripheral 220 could be similarly included in the multi-functional peripheral 200 without departing from the scope and spirit of the invention. In certain embodiments, the multi-functional peripheral 200 provides a system in which various devices serve one another in receiving data in one form and converting it into another for appropriate display, reproduction, or transmission. In certain embodiments, the color photo-copier 250 converts the plurality of unprocessed data 110 to the plurality of processed data 120 having an enlarged size. The plurality of processed data 120 having an enlarged size is then input into the color facsimile 240 wherein it may be viewed as the plurality of unprocessed data 110. The color facsimile 240 performs converts the plurality of unprocessed data 110 to a form suitable for transmission to an external device (not shown). Those having skill in the art will recognize that the image processing system 100, as described in FIG. 1, is contained within the multi-functional peripheral 200 in many of the various embodiments of the invention.

FIG. 3 is a functional block diagram illustrating another embodiment of the present invention. In particular, FIG. 3 illustrates an error diffusion method 300. An input 310 is converted to an output 320 using the error diffusion method 300. A threshold 330 and an error filter 340 operate cooperatively in an intelligent feedback method for providing the conversion of the input 310 to the output 320 using the error diffusion method 300. In certain embodiments of the invention, the input 310 is the plurality of unprocessed data 110 and the output 320 is the plurality of processed data 120. In certain embodiments, the error diffusion method 300 is performed using the multi-functional peripheral 200 as described in FIG. 2. Any of the specific devices described as being contained within the multi-functional peripheral 200 may perform the error diffusion method 300.

In certain embodiments, the input 310 is compared to the threshold 330 to determine whether or not the input 310 lies above or below the threshold 330. After determining the relationship of the input 310 to the threshold 330, the determination is then the fed back to the input 310 through an error filter 340. Additionally, a portion of the input 310 is also fed back to the input 310 through an error filter 340. In certain embodiments, a difference between the input 310 and the threshold 330 is calculated, and the difference is then fed back to the input 310 through an error filter 340. Similarly, a portion of the input 310 is also fed back to the input 310 through an error filter 340 in this embodiment.

In certain embodiments, the threshold 330 is a scalar quantity in which a single input of the input 310 is compared to the threshold 330 at a time. In other embodiments, the threshold 330 is a mask in which a plurality of inputs selected from the input 310 are compared to the threshold 330 simultaneously. Similarly, in certain embodiments, the error filter 340 is a scalar quantity in which a single resultant value of the input 310 and the difference are compared to the error filter 340 at a time. In other embodiments, the error filter 340 is a mask in which a plurality of resultant values of the input 310 and differences are compared to the error filter 340 simultaneously.

FIG. 4a is a system diagram illustrating another embodiment of the present invention. In particular, FIG. 4a illustrates a specific embodiment that uses the error diffusion method described in FIG. 3. In certain embodiments employed in image processing system, an error filter 400 distributes the error associated with a pixel 410 to a plurality of adjacent pixels. An adjacent pixel 420 is representative of the plurality of pixels adjacent to the pixel 410 that contains an error as described in FIG. 3. In certain embodiments, the error is the difference between the input 310 and the threshold 330.

FIG. 4b is a system diagram illustrating another embodiment of the present invention. In particular, FIG. 4b illustrates another specific embodiment that uses the error diffusion method described in FIG. 3. In certain embodiments employed in image processing system, an error filter 450 distributes the error associated with a pixel 460 to a plurality of adjacent pixels using a predetermined coefficient weighting scheme. One specific embodiment of the present invention distributes the error associated with the pixel 460 to the plurality of adjacent pixels using the predetermined coefficient weighting scheme shown provided by the error filter 450.

Figure 5:
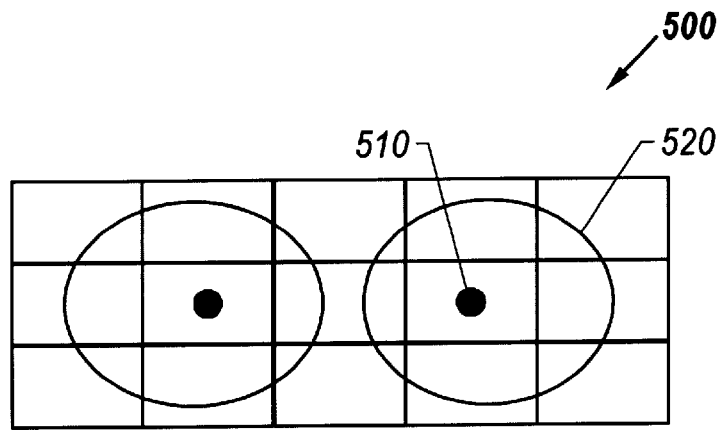
FIG. 5 is a system diagram illustrating another embodiment of the present invention. In particular.

FIG. 5 is a system diagram illustrating another embodiment of the present invention. In particular, FIG. 5 illustrates a plurality of pixels 500. In certain embodiments of the present invention, when a pixel 510 is printed on a printing media, it possesses a certain statistical placement distribution given the mechanical nature by which the pixel is placed on the paper. Invariably, a range 520 contains the outer bounds in which the pixel 510 is printed. An estimation of the range 520 is required in applying the error diffusion method 300 in accordance with the present invention. In certain embodiments, the range 520 extends only to the pixels immediately adjacent to the pixel 510. In other words, the range is limited to being no more than one pixel away from the pixel 510.

Figure 6:
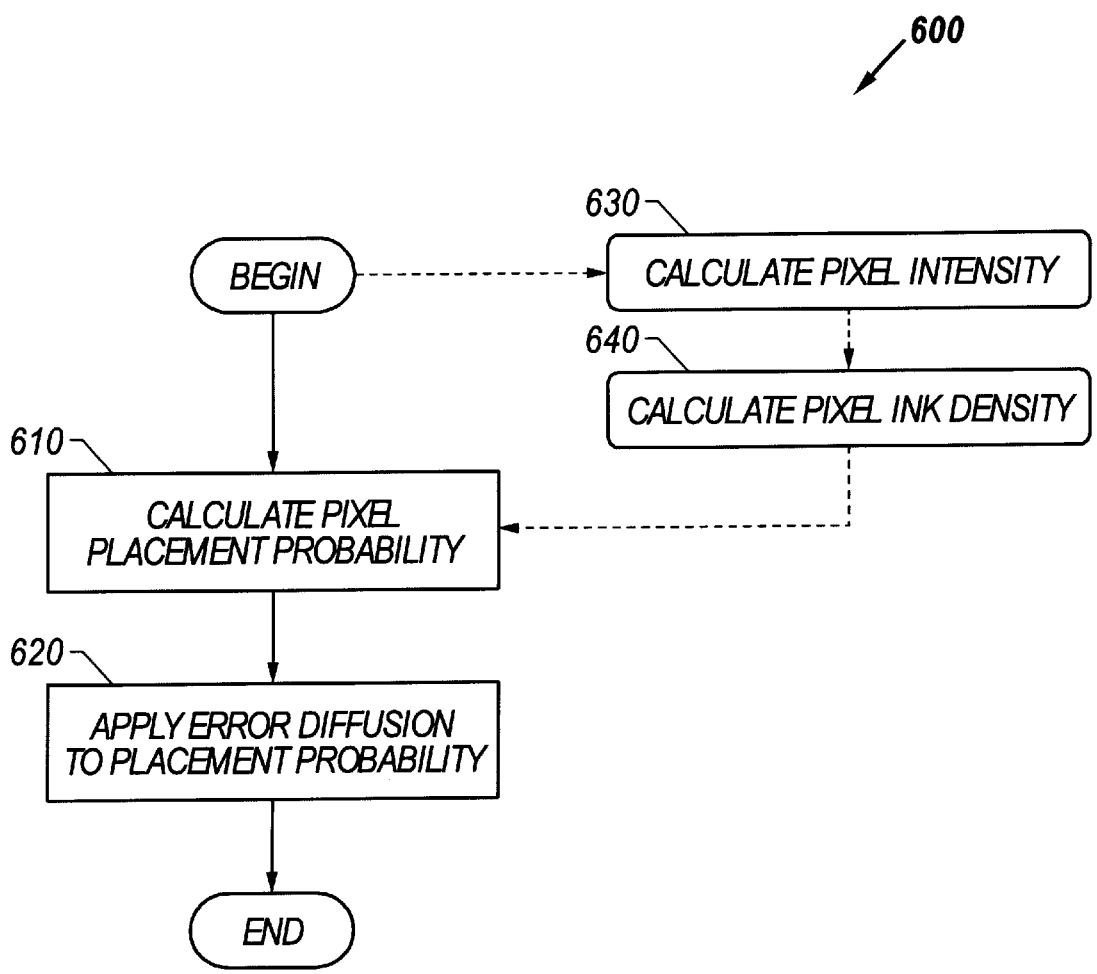
FIG. 6 is a functional block diagram illustrating another embodiment of the present invention. In particular.

FIG. 6 is a functional block diagram illustrating another embodiment of the present invention. In particular, FIG. 6 illustrates a probability error diffusion method 600. In a block 610, a pixel placement probability is calculated corresponding to a pixel. In certain embodiments of the invention, the pixel placement probability is calculated using an intensity of the pixel. The intensity of the pixel is calculated in an alternative block 630. The ink intensity is chroma information in certain embodiments. In other embodiments, it is luminance information. Chroma information is converted into luminance information in certain embodiments. Any characteristic of the pixel from which a pixel intensity may be calculated is appropriate without departing from the scope and spirit of the invention.

In other embodiments, the pixel placement probability is calculated using an ink density of the pixel. The ink density of the pixel is calculated in an alternative block 640. The ink density is an average amount of area within the pixel that is to be covered with ink. In other embodiments, the ink density is a statistical distribution associated with the mechanical method in which ink, paint, or wax, is placed upon a printing medium. Similarly, any characteristic of the pixel from which an ink density of the pixel may be calculated is appropriate without departing from the scope and spirit of the invention.

In certain embodiments, the pixel is the pixel 510 as described in FIG. 5; in other embodiments, it is the pixel 410 of FIG. 4a or the pixel 460 of FIG. 4b. After the pixel placement probability is calculated in the block 610, error diffusion is applied to the pixel placement probability in a block 620.

An advantage of performing error diffusion as a function of probability is that it is inherently decoupled. As described above, when error diffusion is applied to using chroma or intensity information of the pixel, the fact that the pixels are inherently coupled to one another may lead to deleterious effects. By applying error diffusion to a characteristic of the pixel that is inherently decoupled, the undesirable effect of adjacent pixels influencing the error diffusion is avoided.

Figure 7:
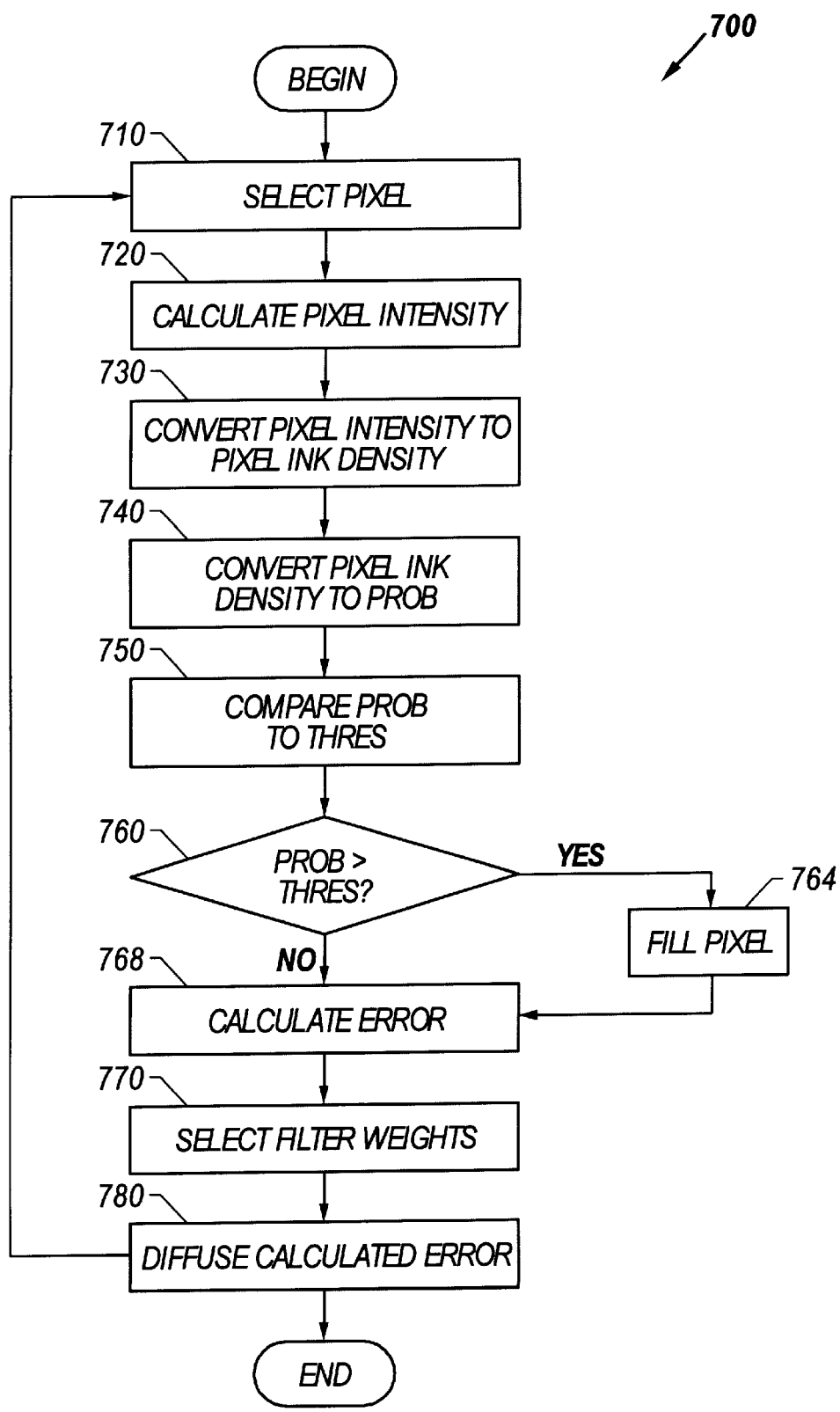
FIG. 7 is a functional block diagram illustrating another embodiment of the present invention. In particular.

FIG. 7 is a functional block diagram illustrating another embodiment of the present invention. In particular, FIG. 7 illustrates another probability error diffusion method 700. A particular pixel is selected in a block 710. This selection is performed arbitrarily in certain embodiments of the invention. In other embodiments, a predetermined method of selecting the pixel is implemented. An example of a predetermined method is a sequential method is the processing of a plurality of image data in which sequential lines of data are processed one after another.

In a block 720, a pixel intensity is calculated for the pixel selected in the block 710. The pixel intensity is calculated using any of the methods described above with respect to FIG. 6. The pixel ink density corresponds to luminance information of the pixel in certain embodiments. The pixel intensity may be calculated using any appropriate characteristic of the pixel. In a block 720, the pixel intensity is converted to a pixel ink density. Similarly, the pixel ink density is calculated using any of the methods described above with respect to FIG. 6. However, in the block 720, the pixel intensity is used at least in part to calculate the pixel ink density. In certain embodiments, an intelligent weighting scheme is used to incorporate the pixel intensity into the pixel ink density calculation. In other embodiments, a predetermined formula incorporating the pixel intensity is applied.

In certain embodiments, the pixel ink density is the average amount of ink inside the pixel. In a block 740, the pixel ink density is converted to a pixel placement probability (PROB). In certain embodiments, the pixel placement probability calculated in the block 740 is the same pixel placement probability calculated in the block 610. The pixel placement probability calculated in the block 740 is calculated by using, at least in part, the pixel ink density calculated in the block 740. In certain embodiments, an intelligent weighting scheme is used to incorporate the pixel ink density into the pixel placement probability calculation. In other embodiments, a predetermined formula incorporating the pixel ink density is applied. In a block 750, the pixel placement probability is compared in a predetermined manner to a threshold (THRES). In certain embodiments, the threshold is the threshold 330 described in FIG. 3. The predetermined manner of comparison is greater that or equal to in certain embodiments and is less than in other embodiments. Specifically in a block 760, the pixel placement probability is compared to the threshold as to whether it is greater than the threshold. In other embodiments and as described above, a different comparison is performed. In certain embodiments wherein the pixel placement probability is not a scalar but is rather a vector, the pixel placement probability vector is compared to the threshold wherein the threshold is itself another vector. An intelligent comparison scheme is employed in comparing these two vectors in certain embodiments of the invention.

In the probability error diffusion method 700, when the pixel placement probability is indeed greater than the threshold as determined in the block 760, then the pixel is filled in a block 764. When the pixel is filled in the block 764, the actual pixel placement probability of the pixel is now 100% or 1.0; the actual pixel placement probability is a print probability in certain embodiments of the invention. In certain embodiments, the difference between the actual pixel placement probability and the pixel placement probability calculated in the block 740 is calculated and stored in a memory. In the probability error diffusion method 700, the difference is an error that is calculated in a block 768. In certain embodiments that perform the error diffusion method 300 cooperatively with the probability error diffusion method 700, the difference is fed back to the input 310 through the error filter 340. Using the error calculated in the block 768, a plurality of filter weights is selected in a block 770. In certain embodiments, the plurality of filters weights is the error filter 340 described in FIG. 3. In other embodiments, it is the error filter 450 as described in FIG. 4b. In a block 780, the error calculated in the block 768 is diffused using the plurality of filter weights selected in the block 770. In certain embodiments, the error is diffused using the error diffusion method 300 as described in FIG. 3, and the error is diffused to pixels adjacent to the pixel selected in the block 710. Specifically, the error diffusion is performed as a function of the pixel placement probability in certain embodiments of the invention. Additionally, the error which is diffused in the block 780. In other embodiments, once the probability error diffusion method 700 is performed with respect to the pixel selected in the block 710, it is performed again using a different pixel.

Figure 8:
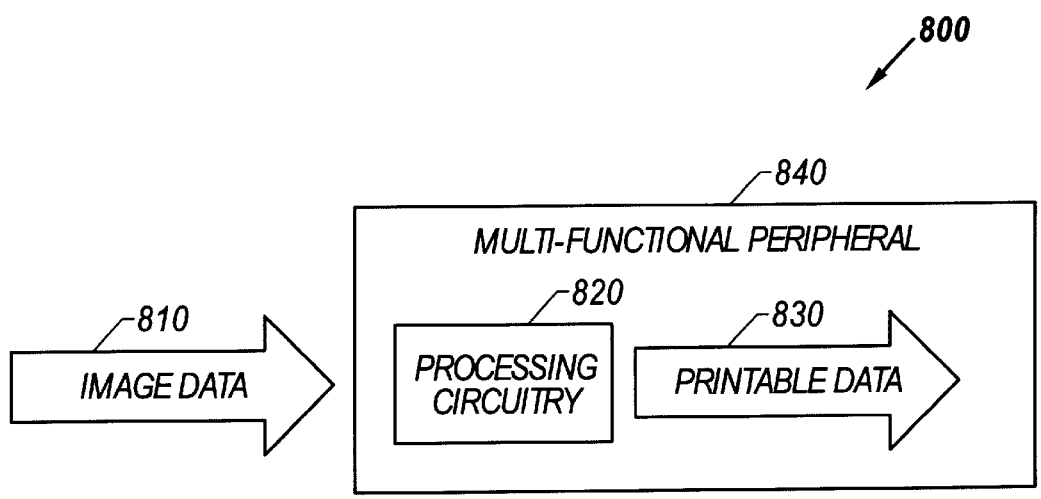
FIG. 8 is a system diagram illustrating another embodiment of the present invention. In particular.

FIG. 8 is a system diagram illustrating another embodiment 800 of the present invention. In particular, FIG. 8 illustrates a multi-functional peripheral 840 that performs image processing to make a plurality of data suitable for printing. In certain embodiments of the invention, the multi-functional peripheral 800 is the multi-functional peripheral 200 as described in FIG. 2. The multi-functional peripheral 840 contains processing circuitry 820 that is used to process a plurality of image data 810. The multi-functional peripheral 840 converts the plurality of image data 810 into a plurality of printable data 830. The plurality of printable data 830 is in a form suitable for printing on color ink jet printers in certain embodiments of the invention. In other embodiments, it is in a form suitable for laser printers. In certain embodiments of the invention, the processing circuitry 820 is the image processor 210 as described in FIG. 2. In other embodiments, it is internal processing resources contained within any of the devices contained within the multi-functional peripheral 200 of FIG. 2 including the any other peripheral 220.

Figure 9:
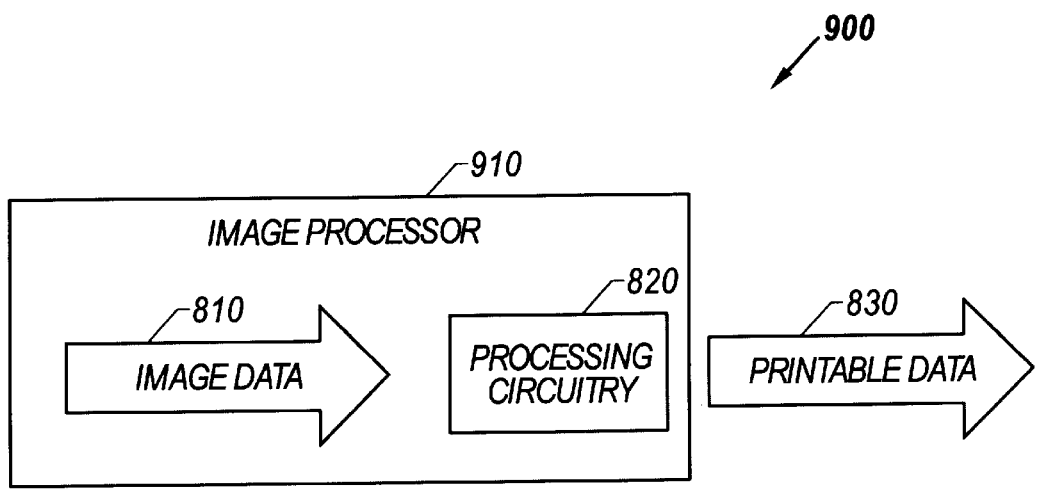
FIG. 9 is a system diagram illustrating another embodiment of the present invention. In particular.

FIG. 9 is a system diagram illustrating another embodiment 900 of the present invention. In particular, FIG. 9 illustrates an image processor 910 that performs image processing to make a plurality of data suitable for printing. The image processor 910 contains the processing circuitry 820. In certain embodiments, the image processor 910 is substantially the same as the image processor 210 as described in the multi-functional peripheral 200 of FIG. 2. The processing circuitry 820 is used to process the plurality of image data 810 into the plurality of printable data 830. In certain embodiments of the invention, the image processor 910 is a processing system internal to any of the devices contained within the multi-functional peripheral 200 of FIG. 2 including the any other peripheral 220.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A printing method employing error diffusion, the printing method comprising:
    calculating a placement probability of at least one pixel;
    determining an error of the placement probability of the at least one pixel; and
    diffusing the error of the placement probability of the at least one pixel using at least one threshold to at least one additional pixel.

2. The printing method of claim 1, further comprising:
    determining an intensity of the at least one pixel; and
    calculating a density of the at least one pixel using the intensity.

3. The printing method of claim 1, wherein the at least one threshold is selected from a threshold mask, the threshold mask comprising a plurality of thresholds.

4. The printing method of claim 1, further comprising:
    printing the at least one pixel on a printing medium when the placement probability of the at least one pixel has a predetermined relationship to the at least one threshold; and
    determining a print probability, the print probability is based, at least in part, on whether or not the at least one pixel is printed on the printing medium.

5. The printing method of claim 4, wherein the error of the placement probability of the at least one pixel comprises a difference between the placement probability and the print probability.

6. The printing method of claim 1, further comprising:
    printing the at least one pixel on a printing medium using at least one color, the at least one color being selected from a plurality of colors; and
    the plurality of colors comprises cyan, magenta, and yellow.

7. The printing method of claim 1, wherein the at least one pixel has a shape that is substantially circular.

8. The printing method of claim 1, wherein the printing method is performed using a peripheral device.

9. The printing method of claim 1, wherein the printing method is performed using a stand alone device.

10. A printing method employing error diffusion, the printing method comprising:
    selecting at least one pixel from a plurality of pixels;
    identifying a pixel intensity of the at least one pixel;
    identifying a density of the at least one pixel;
    identifying a placement probability of the at least one pixel;
    comparing the placement probability of the at least one pixel to a print probability, the print probability is based, at least in part, on whether or not the at least one pixel is to be printed on a printing medium;
    identifying an error of the placement probability of the at least one pixel, the error comprises a difference between the placement probability and the print probability; and
    diffusing the error of the placement probability of the at least one pixel using a threshold mask to at least one additional pixel.

11. The printing method of claim 10, wherein the threshold mask comprises a plurality of coefficients.

12. The printing method of claim 10, wherein the diffusing the error of the placement probability of the at least one pixel using a threshold mask further comprises diffusing the error to at least one additional plurality of pixels adjacent to the at least one pixel.

13. The printing method of claim 10, wherein the error of the placement probability of the at least one pixel is substantially negligible.

14. The printing method of claim 10, wherein the printing method is performed using a peripheral device.

15. The printing method of claim 10, wherein the printing method is performed using a stand alone device.

16. A printing system comprising:
    a plurality of channels that print at least one pixel using at least one color;
    a processing circuit in signal communication with the plurality of channels, the processing circuit determines which of a plurality of channels will print the at least one pixel on a printing medium by identifying at least one characteristic of the at least one pixel;
    the processing circuit diffuses an error of the at least one characteristic of the at least one pixel to at least one additional pixel.

17. The printing system of claim 16, wherein the color ink printing system is contained within a peripheral device.

18. The printing system of claim 16, wherein the color ink printing system is contained within a stand alone device.

19. The printing system of claim 16, wherein the at least one characteristic of the at least one pixel comprises a placement probability.

20. The printing system of claim 16, wherein the processing circuit determines a print probability, the print probability corresponding to whether or not the at least one pixel is printed on the printing medium; and
    the error of the placement probability of the at least one pixel comprises a difference between the placement probability and the print probability.

* * * * *